Fig. 2

INVENTOR:
ROBERT P. ZUNDEL
ATTORNEYS

United States Patent Office 3,215,001
Patented Nov. 2, 1965

3,215,001
CONTROL SYSTEM FOR A MULTIPLE SPEED RATIO POWER TRANSMISSION MECHANISM WITH HYDROKINETIC COUPLINGS
Robert Philip Zundel, Wayne, Mich., assignor to Ford Motor Company, Dearborn, Mich., a corporation of Delaware
Filed June 17, 1963, Ser. No. 288,354
11 Claims. (Cl. 74—732)

My invention relates generally to multiple speed ratio power transmission mechanisms, and more particularly to a power transmission mechanism that employs hydrokinetic units for controlling the relative speeds of gear elements of the mechanism to establish plural speed ratios. I contemplate that the transmission and control system of my invention can be employed in a drive line for an engine powered automotive vehicle.

It is an object of my invention to provide an improved automatic control valve system for filling and emptying the hydrokinetic units in timed sequence to establish a transition from one speed ratio to another with a maximum degree of smoothness.

It is a further object of my invention to provide a transmission control system that responds to operating variables such as engine torque demand and vehicle speed to initiate ratio shifts by rendering the couplings operative or inactive in accordance with the operating requirements.

In a preferred embodiment of my invention, tandem couplings are employed to distribute driving torque from the vehicle engine to a power input element of a multiple speed ratio gear unit. A first low speed ratio can be obtained by filling a first of the couplings while the other remains emptied. This establishes a fluid coupling connection between the engine and a first power input element of the gear unit. To establish intermediate speed ratio operation, the first coupling is emptied and the second coupling is filled. This establishes a fluid coupling connection between the engine and a second power input element of the gear unit.

High speed ratio is obtained by emptying the second coupling and engaging a friction clutch that establishes a direct driving connection between the engine and the power output shaft.

A valve system including speed sensitive drain valves is employed with the couplings to accomplish the sequential filling and evacuation of the couplings. The drain valves respond to appropriate pressure signals that are distributed thereto by two so-called shift valves that in turn are sensitive to vehicle speed and engine torque demand. A positive displacement, variable capacity pump is provided for supplying control pressure to the valve system as well as fluid to the bladed cavaties of the hydrokinetic units.

The passage structure that connects the pressure source to the couplings is defined in part by limit valves that are sensitive to changes in the circuit pressure during the time interval in which the couplings are being filled. They respond to variations in the circuit pressure to adjust the rate of feed to the couplings and in this way preserve line pressure. This avoids an undesirable drop in line pressure due to the high rate of fluid delivery that must be provided by the positive displacement pump to fill the bladed cavities of the hydrokinetic units during a shift sequence. The provision of such a limit valve arrangement is another object of my invention.

My improved valve system includes also means for establishing a synchronous shift between the operation of the friction clutch and the associated hydrokinetic unit. Since the hydrokinetic units tends to become filled more slowly at low operating speeds that at high operating speeds, it is necessary to vary the corresponding rate of disengagement of the friction clutch. This timing characteristic is accomplished by an improved accumulator valve system acting in cooperation with an orifice arrangement. It includes portions that are sensitive to vehicle speed so that the desired delay in the clutch release time is obtained when the vehicle speed is reduced. The provision of such a timing valve system is another object of my invention.

It is another object of my invention to provide a valve arrangement that will overrule the function of the accumulator system when the vehicle is brought to a sudden stop. This eliminates the possibility of stalling the engine and permits a quick release of the direct drive clutch following rapid down-shifts of the two shift valves.

It is a further object of my invention to provide an improved valve means for establishing a pressure signal that is sensitive to engine torque demand. I contemplate that this valve means will provide a sufficient increase in the pressure signal as the vehicle engine carburetor throttle setting is advanced. After a predetermined pressure signal is developed, it is maintained at that value. A fluid pressure detent feel is experienced when the valve means is adjusted to a position corresponding to an advanced engine throttle setting.

Other objects and features of my invention will become apparent from the following description and from the accompanying drawings, wherein:

Figure 1:
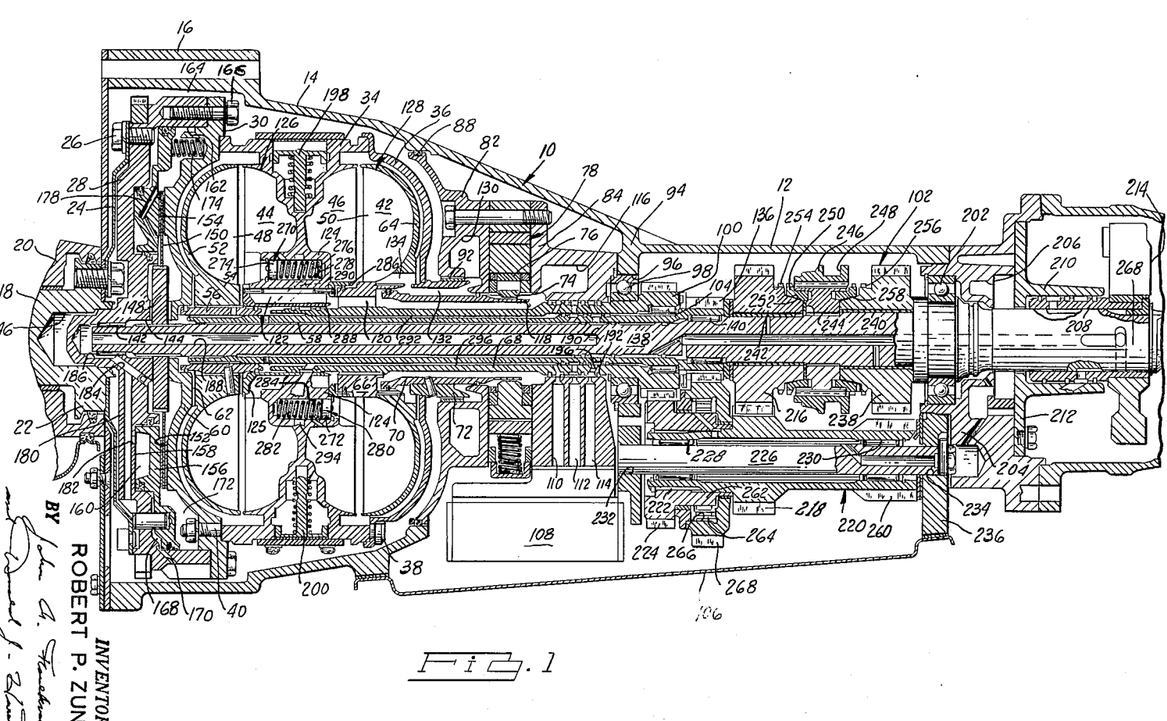
FIGURE 1 shows a cross-sectional view of a tandem fluid coupling power transmission mechanism capable of incorporating the improvements of my invention.

Referring first to FIGURE 1, numeral 10 generally indicates a transmission housing. It comprises a relatively small dimensional portion 12 and a larger dimensional portion 14. The periphery 16 of the housing can be bolted to the engine block for an internal combustion vehicle engine.

The crankshaft for the engine is shown in part at 18. It is journaled within a bearing support 20 and includes a flange 22 that is bolted to a drive plate 24. The periphery of the drive plate 24 is secured by bolts 26 to the outer periphery of a first coupling housing part 28.

The coupling housing includes also a part 30 having a torus shaped recess that conforms to the shape of a first turbine member 32. The coupling housing includes also an impeller shell 34 and an end part 36, the periphery of the part 36 being bolted to the shell 34 by bolts 38. Part 30 is bolted at the other end of the shell 34 by means of bolts 40.

Part 36 is formed with a toroidal recess that conforms in shape to a second turbine member 42.

Impeller shell 34 comprises a pair of juxtaposed toroidal recesses that cooperate respectively with turbine member 32 and turbine member 42. Impeller blades 44 are situated in one recess and impeller blades 46 are situated in the other. Blades 44 define radial fluid flow passages which cooperate with corresponding flow passages that are defined by driven blades 48 of the turbine member 32. In a similar fashion, blades 46 cooperate in fluid flow relationship with radial flow passages defined by turbine blades 50 that form a part of turbine member 42.

Blades 48 are carried by a turbine shroud 52 which is connected to a hub 54. This hub in turn is secured to sleeve member 56 which in turn is splined to a turbine sleeve shaft 58. Hub 54 is separated from hub portion 60 of housing part 30 by means of a thrust washer 62.

Turbine member 42 includes a shroud 64 which is connected to a turbine hub 66. This hub in turn is splined to a second turbine sleeve shaft 68 extending concentrically through the shaft 58. Hub 66 is arranged in sealing relationship with respect to an impeller sleeve 70. This sleeve is pinned or otherwise positively connected to hub 72 of the impeller shell part 36. The sleeve 70 extends concentrically with respect to the shafts 58 and 68 and is keyed or splined at 74 to rotor 76 of a variable displacement fluid pressure pump generally identified by reference character 78.

Pump 78 includes a rotor chamber 80, a first pump housing part 82 and a second pump housing part 84.

The periphery 86 of the housing part 82 is sealed at 88 to an inner sealing surface formed in the transmission housing part 14. Hub 72 is journaled by means of bushing 90 within a cooperating central opening formed in part 82 which provides a support for the coupling housing structure.

Pump housing part 84 is formed with a central opening through which shafts 68 and 58 extend. It is secured to a wall 94 formed at the juncture of transmission housing portions 12 and 14.

Wall 94 is formed with a bearing opening 96 which receives a roller bearing 98. This bearing journals shaft 68. The end of shaft 68 is connected to or formed integrally with a power input gear element 100 of a gear assembly generally identified by reference character 102. A needle bearing 104 is situated between shafts 58 and 68 to provide needed support.

The lower portion of the transmission housing portions 12 and 14 define a sump which is closed by an oil pan 106. Disposed within the oil sump is a control valve body 108. This body in turn is secured to pump housing part 84 and is in fluid communication with passages 110, 112 and 114 formed in pump housing part 84.

Housing part 84 defines a fluid pressure plenum chamber 116 which is in fluid communication with a passage 118 defined by the concentrically disposed shaft 68 and sleeve 70. This passage 118 extends through cooperating openings 120 formed in hub 68 and through cooperating openings 122 formed in the hub 124 of the impeller shell 34. Openings 122 in turn communicate through radial passages 125 with the interior of the coupling of which turbine blades 48 and impeller blades 44 form a part. For the purpose of this description, this coupling hereinafter will be identified generally by reference character 126. Reference character 128 will be used to identify generally the other coupling.

Pump housing part 82 defines another fluid pressure plenum chamber 130. This chamber is in fluid communication with a passage 132 formed in the sleeve 72. Passage 132 communicates with the interior of the coupling 128 through openings 134 formed in the hub of shroud 64.

The right hand end of the sleeve shaft 58 is secured or is formed integrally with a second power input element 136 that forms a part of the gear assembly 102. Journaled concentrically within shafts 58 and 68 is a central shaft 138. One of the bearings that is used to provide support is shown at 140. Shaft 138 extends through shaft 58 and is journaled by means of a bearing 142 within an opening 144 in the hub of coupling housing part 28. This hub in turn is received within a pilot recess 146.

Splined to shaft 138 is a hub 148 of a direct drive friction clutch. The periphery of hub 148 has connected thereto a friction disc 150 which is situated between a first friction surface 152 and a second friction surface 154. Surface 152 is formed on coupling housing part 30 and surface 154 is formed on an annular piston member 156.

Piston member 156 is received within a cooperating annular cylinder 158. A fluid pressure cavity 160 is defined by piston 156 and cylinder 158.

Piston member 156 extends radially outwardly and is situated in sealing relationship with a cylindrical surface 162 formed in the periphery 164 of coupling housing part 28. This periphery is bolted by bolts 166 to part 30.

An annular cavity is situated on each side of the outer peripheral portion of piston member 156. The cavity identified by reference character 168 is vented by means of a vent passage 170 to the exterior of the coupling housing. The other cavity, which is identified by reference character 172, is in fluid communication with the lubrication oil system and is filled with lubricating oil during operation. Piston return springs 174 are situated in this cavity 172 between piston 156 and part 30 to urge normally the piston 156 in a left hand direction as viewed in FIGURE 1.

Cavity 172 is in fluid communication with the radially inward region 176 in the interior of the coupling housing. This communication is established by passages 178 formed in piston 156.

Pressure chamber 160 communicates with a pressure feed passage 180 which is formed in housing part 128. Cross-flow ports 182 are provided for this purpose. Passage 180 communicates with a passage 184 that extends to the opening 144 in the hub of parts 28, a suitable groove 186 being provided for this purpose. Fluid pressure is distributed to passages 180 and 184 through a central passage 188 formed in shaft 138. Passage 188 in turn communicates with passage 114 through radial ports 190, 192 and 196 formed in shafts 138, 58 and 68, respectively.

The outer portion of the impeller shell part 34 carries drain valves, two of which are identified by reference characters 198 and 200. These valves, as well as the other circuitry for controlling the operation of the couplings, will be described more particularly with reference to FIGURE 3. They are capable of assuming either a radially inward position or a radially outward position and are influenced by centrifugal force developed by reason of the rotation of the coupling impellers. When they assume a radially inward position, they condition the couplings for operation by blocking an exhaust flow path for the coupling fluid. When they assume a radially outward position, however, they open the exhaust flow path thereby permitting the couplings to empty. As will subsequently become apparent, the effect of the centrifugal force on the valves 198 and 200 can be overcome by applying a suitable fluid pressure signal to the valve chambers within which they act.

Shaft 138 extends through the gear assembly 102 and is journaled by means of a bearing 202 within a bearing opening formed by an end closure member 204. This member defines a pump chamber 206 which receives positive displacement pumping elements that are drivably associated with shaft 138. A pressure distributor manifold 208 is received over the end of shaft 138 and is journaled within an extension 210. This extension 210 is formed on a pump housing closure plate 212.

A tailshaft driven fluid pressure governor is indicated generally by reference character 214. It forms a part of the control circuit that will be described with reference to FIGURE 3.

Journaled upon the shaft 138 within the housing 12 is a gear 216 which meshes drivably with gear element 214 of a cluster gear assembly generally identified by reference character 220. This gear element in turn is splined at 222 to a gear element 224 of the cluster gear assembly 220. Assembly 220 defines in part a sleeve that is journaled upon a countershaft 226, bearings 228 and 230 being provided for this purpose. One end of shaft 226 is disposed within an opening 232 within the wall 94. The other end is disposed within an opening 234 formed in an end wall 236 for the housing portion 12.

Another gear 238 is journaled upon shaft 138. Bushings 240 and 242 are provided for the gears 238 and 216, respectively.

A synchronizer hub 244 is splined to shaft 138 at a point intermediate the gears 216 and 238. It is externally splined to receive an internally splined synchronizer sleeve 246. The sleeve 246 includes a groove 248 which may receive the forks of a shifter fork mechanism that in turn may be under the control of a vehicle operator. As the sleeve 246 is shifted in a left hand direction, a synchronizer thrust element, through the action of a spring loaded detent, exerts an axial force upon a blocker ring 250. This in turn causes cone clutch surfaces 252 to become frictionally engaged.

As the sleeve 246 is shifted in this fashion, its movement is interrupted by the blocker element 250 until gear 216 and the shaft 138 are brought into synchronism. Once synchronism is established, however, sleeve 246 can be shifted until its internal teeth drivably engage teeth 254 carried by gear 216. Gear 216 thus becomes locked to shaft 138.

If the sleeve 246 is shifted in a right hand direction, as viewed in FIGURE 1, the gear 238 becomes locked to shaft 138 in a similar fashion. The teeth 256 carried by gear 238 then become engaged with the internal teeth of sleeve 246. A blocker ring 258 is provided for establishing synchronism and its function is similar to the function of blocker ring 250.

Gear 238 is adapted to mesh with a reverse idler gear, not shown, which is journaled for rotation about an axis that is parallel to the axis of shaft 138. This reverse idler, in turn, meshes with gear element 260 which forms a part of cluster gear assembly 220.

Gear element 224 is formed with a hub extension 262. This extension forms the inner race of an overrunning clutch assembly 264. In FIGURE 1, this assembly is in the form of sprags that are caged together, but I contemplate that rollers may be employed as well. The outer race for the clutch assembly 264 is formed by the inner surface of an opening 266 formed in a gear element 268. This gear, in turn, is journaled by bushings situated on either side thereof and drivably engages gear 136.

To establish low speed ratio operation, coupling 126 is filled with fluid, coupling 128 is exhausted and the friction clutch, shown in part at 150, is disengaged. Engine torque then is delivered to the impellers and establishes fluid flow circulation in the coupling 126. The resulting turbine torque is delivered through shaft 58 to gear 136. This causes gear 268 to be driven at a reduced speed ratio. The synchronizer clutch sleeve 248 is shifted in a left hand direction so that gear 216 becomes locked to shaft 138. Driven torque then is delivered from gear element 224 to gear element 218 which in turn drives gear 216 and shaft 138. This shaft 138, of course, is directly connected to or forms a part of the driven shaft which is identified by reference character 268.

To establish intermediate speed ratio operation, the synchronizer clutch sleeve 246 remains in a left hand position and coupling 128 is filled. Engine torque then drives the compound impeller assembly which establishes toroidal fluid flow circulation in coupling 128. The resulting turbine torque applied to turbine 46 is distributed then through shaft 68 to gear 100. This gear in turn drives gear element 224. The cluster gear assembly 220 then overspeeds gear 136, the overrunning coupling 264 permitting this to occur. Gear 136 thus becomes inoperative and turbine torque is delivered through a parallel path defined in part by gear 100 and gear element 224.

Torque is delivered then from gear 224 to gear element 218 which in turn drives gear 216 and shaft 138 at an intermediate speed ratio.

To establish high speed ratio operation, coupling 128 is evacuated and the friction disc clutch is applied. This is a synchronous shift and, as subsequently will be explained, a certain degree of overlap in the application of the clutch and the evacuation of the coupling is desired. After the friction disc clutch is applied, engine torque is delivered directly from the engine through the clutch and through shaft 138 to the driven shaft 268.

To establish reverse drive operation, it merely is necessary to move the synchronizer sleeve 246 in a right hand direction to lock the gear 238 to the shaft 138. The coupling 126 is filled while the coupling 128 is evacuated. The turbine torque of the turbine 32 then is delivered through shaft 58 to gear 136. This, of course, causes torque to be delivered through gear element 260 and the reverse idler gear to gear 238. The gear 238 and the shaft 136 thus are driven in a direction that is opposite to the direction of rotation of the coupling impellers.

Figure 2:
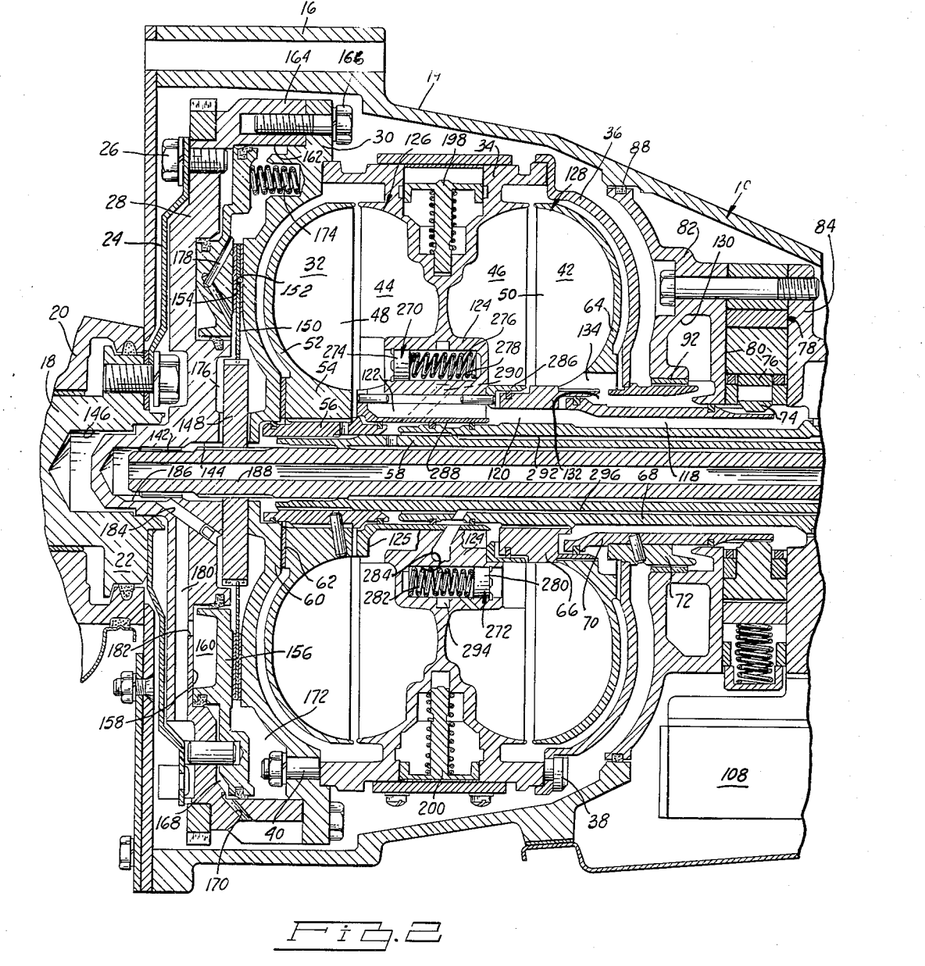
FIGURE 2 is an enlarged view of the hydrokinetic coupling units of the structure of FIGURE 1.

Referring next to FIGURE 2, the hub 124 of the impeller assembly includes a pair of coupling vent valves, one valve being associated with coupling 126 and the other being associated with coupling 128. These are identified respectively by reference characters 270 and 272. Valve 270 comprises a valve plunger 274 that is biased in a left hand direction as viewed in FIGURE 2 by a valve spring 276. Plunger 274 is slidably situated within a cylindrical bore 278. As will be explained subsequently with reference to FIGURE 3, valve 270 controls the discharge of air from coupling 126 as it is being filled.

Valve 272 is similar in construction to valve 270 and includes a valve plunger 280 which is spring biased in a right hand direction by valve spring 282. Valve plunger 280 is slidably situated within a circular bore 284 formed in hub 124.

An impeller hub sealing element 286 is pinned to hub 214 and received over the hub 66 of the turbine 42. A fluid pressure distributor sleeve 288 is received over sleeve shaft 68 in sealing relationship therewith. It also is pinned to the hub 124 as indicated. The sleeve 288 is apertured to establish communication between an air exhaust passage 290 and an annular passage 292 situated between shaft 138 and 58. Another port in sleeve 288 establishes communication between an exhaust passage 294 and an annular passage 296 disposed between shafts 58 and 68. These passages 292 and 296 also accommodate a controlled degree of flow of fluid from the coupling as will be explained subsequently.

Figure 3:
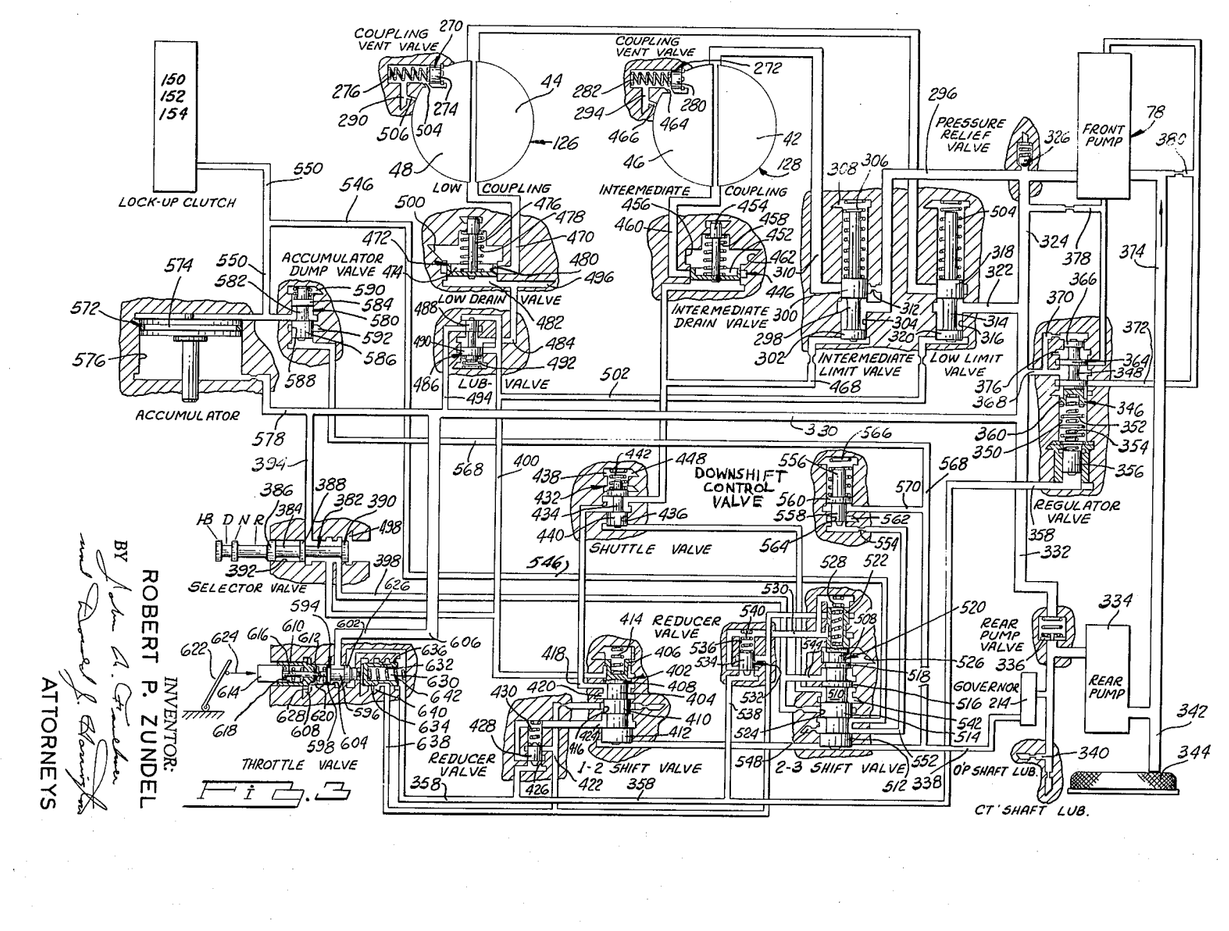
FIGURE 3 is a schematic view showing the valve system used in establishing the speed ratio changes in the mechanism of FIGURE 1.

Referring next to FIGURE 3, pump 78, which is a variable displacement pump as mentioned previously, delivers pressure to passage 296. This pump 78 can be of known construction such as that shown in FIGURE 6 of U.S. Patent Number 3,077,122.

Passage 296 communicates with an intermediate coupling limit valve 298 which comprises a pair of valve lands 300 and 302 situated slidably within a valve chamber 304. Valve 298 is urged in a downward direction, as viewed in FIGURE 3, by valve spring 306 situated in the upper end of valve chamber 304. This upper end is vented at 308.

Valve chamber 304 communicates with the intermediate coupling through a feed passage 310. When the valve 298 is in the position shown, valve land 300 blocks passage 310 and interrupts communication between the coupling 128 and the pump 78.

A parallel flow path between passages 296 and 310 is provided by restriction 312. This restriction is blocked by the land 300 when the valve 298 assumes the position shown.

Distribution of fluid through the coupling 126 is controlled by a low coupling limit valve 314 situated slidably within valve chamber 316. Valve 314 includes valve lands 318 and 320 and a passage 322 communicates with chamber 316 at a point between them. Passage 322 in turn communicates with a line pressure passage 324 which receives fluid pressure from the discharge side of the pump 78.

A safety pressure relief valve is shown at 326 to limit the maximum pressure that may be made available to the circuit by the pump 78.

The coupling feed passage for the coupling 128 is shown at 328. It communicates with valve chamber 316 at a point between the lands. Passages 310 and 328 correspond respectively to passages 118 and 132. These passages 118 and 132 are referred to in the description of FIGURES 1 and 2.

A main line pressure passage is shown at 330. This line 330 is fed by passage 324 and also by a passage 332 which communicates with a rear pump 334 situated within pump chamber 206 shown in FIGURE 1. Communication between passage 332 and pump 334 is interrupted, however, by a one-way check valve 336 which accommodates flow from pump 334 to passage 332 but inhibits flow in the opposite direction. Under certain operating conditions, the rear pump is capable of supplying pressure to the passage 330 through the check valve 336. This might occur when the vehicle is coasting under hill brake conditions or when a push start is attempted.

Governor 214 is supplied with pressure from the rear pump 334. It modulates this pressure in known fashion to supply a vehicle speed signal to passage 338. The rear pump supplies also a lubrication oil circuit shown in part at 340.

The delivery to the pumps 334 and 78 is provided by a low pressure supply passage 342 which communicates with the sump at the lower portion of the transmission housing. A filter screen 344 is located in the sump.

A regulator valve for the variable displacement pump 78 is indicated generally by reference character 346. It includes a multiple land valve spool 348 slidably disposed within a valve chamber 350. Spool 348 is biased in an upward direction by valve springs 352 and 354. The latter acts upon the upper end of a regulator valve plug 356 slidably situated within a lower portion of the valve chamber. It is subjected to torque demand sensitive pressure as will be explained subsequently. This pressure is distributed to the lower end of valve plug 356 through a throttle pressure passage 358. As the pressure in passage 358 increases, the spring force of spring 354 increases thereby altering the regulating characteristics of valve 348 appropriately.

Valve 348 includes multiple lands 360, 362, 364 and 366. An exhaust port 368 is located in the valve chamber 350 intermediate the lands 360 and 362. Line pressure is distributed to the chamber 350 through a branch passage 369. Line pressure is distributed to the upper end of valve land 366 through a passage 370, and produces a pressure force that opposes the force of the valve springs. As the line pressure is increased, valve 348 is urged downwardly as viewed in FIGURE 3, thereby increasing the degree of communication between passage 369 and the passage 372 which extends to one side of a displacement varying slide for the pump 78. As the degree of communication between passages 369 and 372 thus is increased, the degree of communication between exhaust port 368 and passage 372 is decreased. In a similar fashion, as the line pressure increases, the degree of communication between passage 369 and a passage 374 is decreased while the degree of communication between passage 374 and a second exhaust port 376 is increased. This results in a decrease in the pressure in passage 374 which in turn communicates with the other side of the slide for the displacement varying mechanism of the pump 78. A restricted by-pass passage 378 extends between passages 324 and 374 to eliminate a fluid lock. In a similar fashion, a corresponding restricted by-pass passage 380 is provided between passages 372 and 342.

By varying the magnitude of the throttle pressure in passage 358, the displacement of the pump 78 can be increased thereby providing a corresponding increase in the pressure that is made available to passage 330. Conversely, a reduction of throttle pressure will result in a decrease in pressure in passage 330 and a corresponding decrease in the displacement of the pump 78.

The coupling feed system for the low coupling and the intermediate coupling and the cooperating valve structure is semi-isolated from the remaining portion of the circuit. Communication from the pump 78 to each of the couplings is established in a direct fashion and is controlled only by the respective limit valves.

A selector valve for the automatic control valve system is shown at 382. This valve is under the control of the vehicle operator and can be moved to any of the drive range positions indicated in FIGURE 3 by the symbols HB, D, N and R. These positions correspond respectively to hill brake position, drive position, neutral position, and reverse position.

Valve 382 comprises a valve spool 384 having three spaced valve lands 386, 388 and 390. Spool 384 is situated slidably within a valve chamber 392 which in turn communicates with passage 330 through a line pressure passage 394. In the position shown in FIGURE 3, valve spool 384 is in the drive position. Communication then is established between line pressure passage 394 and a shift valve feed passage 396. Communication is established also between passage 394 and another shift valve feed passage 398.

Passage 396 communicates with a passage 400 which in turn extends to the 1–2 shift valve 402. This valve includes a valve spool 404 having multiple lands 406, 408, 410 and 412.

Valve spool 404 is biased in a downward direction as viewed in FIGURE 3 by valve spring 414. It is slidably situated within a valve chamber 416.

When the valve spool 404 assumes the position shown, passage 400 is blocked by the valve lands 406 and 408. A 1–2 signal passage 418 also communicates with the valve chamber 416 and is in communication with an exhaust port 420 when the valve spool 404 assumes the position shown. This communication is established by the annular space between valve lands 408 and 410.

A kickdown pressure passage 422 communicates with the valve chamber 416 and is blocked by a land 410 when the valve spool 404 assumes the position shown.

The previously mentioned governor pressure passage 338 communicates with the lower end of the shift valve chamber and acts upon valve land 412 to urge valve spool 404 normally in an upward direction as viewed in FIGURE 3.

Land 410 is smaller in diameter than land 412. The differential area thus defined is subjected to reduced throttle pressure which is distributed thereto through the reduced throttle pressure passage 424. This reduced throttle pressure passage 424 in turn communicates with the 1–2 TV reducer valve comprising a valve chamber 426 within which a single land reducer valve element 428 is situated. Element 228 is biased in a downward direction by valve spring 430. It is urged in an upward direction by throttle pressure in passage 358. It thus will be apparent that the magnitude of the pressure in passage 424 is reduced by an amount that depends upon the calibration of spring 430. This reduced throttle pressure acts upon the upper end of the valve element 428. The reducer valve can be calibrated to provide the desired minimum engine throttle up-shift point for the 1–2 shift valve 402.

Passage 418 communicates with a shuttle valve 432 which comprises a valve spool 434 situated within a valve chamber 436. Spool 434 includes two spaced valve lands 438 and 440. The shuttle valve element 432 is biased in a downward direction as viewed in FIGURE 3 by a valve spring 442. When the shuttle valve assumes the position shown, communication is established between the passage 418 and a passage 444 which extends to the intermediate drain valve 446. When it assumes an upward position, however, passage 418 becomes blocked by land 440 and communication is established between passage 444 and an exhaust port 448. The pressure in passage 444 thus is effective or is exhausted depending upon the position of the valve spool 434. Movement of the valve element 434 is accomplished by a 2–3 pressure signal distributed to the lower end of valve land 440 through a passage 450.

The intermediate coupling drain valve 446 comprises a large diameter valve land 452 and a valve guide stem 454. Land 452 is slidably situated within a chamber 456 and is biased normally in a downward direction, as viewed in FIGURE 3, by a valve spring 458.

An exhaust passage for the coupling 128 is shown at 460. It communicates with the valve chamber 456 and is blocked normally when the land 452 assumes an upward position as indicated in FIGURE 3. When land 452 assumes a downward position, however, communication is established between passage 460 and an exhaust port 462 in the chamber 456.

The position of the intermediate coupling drain valve is controlled by the pressure in passage 444 which acts upon the lower surface of the land 452.

Passage 460 is located in a radially outward region of the coupling and when it is open to exhaust, the coupling chamber is evacuated quickly. The oil is replaced by air that is admitted to the chamber through the coupling vent valve.

When the coupling is being filled, the drain valve assumes the position shown. The coupling vent valve 272 then is effective to allow the air to become displaced through a relatively large diameter exhaust port 464 which communicates with exhaust passage 294. After the coupling is filled, however, fluid pressure acts upon valve element 280 and urges it in a left-hand direction as viewed in FIGURE 3 against the opposing force of spring 282. This closes off port 464 and prevents evacuation of fluid through it. A relatively small orifice shown at 466 remains open, however, to provide a constant bleed of coupling fluid into the exhaust region. This prevents a fluid lock and establishes a desirable amount of flow of oil through the coupling for cooling purposes.

It will be apparent, therefore, that upon an increase in governor pressure to a given value for any given magnitude of the throttle pressure, valve element 404 will be shifted in an upward direction to permit passage 400 to communicate with passage 418. Exhaust port 420 is blocked under these circumstances. A 1–2 signal is distributed through passage 418 and through a shuttle valve to the drain valve. This same signal is distributed to the lower end of the intermediate limit valve chamber 304 and acts upon the valve land 302 to urge the limit valve in an upward direction. Communication between the intermediate limit valve and passage 444 is established by passage 468. This causes the limit valve to move in an upward direction as viewed in FIGURE 3 to establish communication between feed passage 310 and passage 296. Since the drain valve is closed and the limit valve is open, intermediate coupling 128 fills immediately. This occurs upon a 1–2 upshift.

If for any reason, the line pressure should fall due to the high delivery requirements of the coupling and the inability of the pump 78 to supply these requirements, the magnitude of the intermediate signal will be reduced correspondingly since it is equal in magnitude to the line pressure that is received from the selector valve. The selector valve, of course, receives its pressure from the main line pressure passage 330 as explained previously. The limit valve then will tend to move downwardly to decrease the degree of communication between feed passage 310 and the passage 296. This of course will reduce the rate of fill of the coupling so that line pressure can be restored to a desired value. The intermediate limit valve thus functions both as a fluid pressure distributor mechanism for the intermediate coupling and also as a regulator valve which establishes a lower limit for the line pressure during the time interval in which the intermediate coupling is being filled.

The low speed coupling 126 receives its fluid through feed passage 328 as explained previously. The exhaust passage located at the radially outward region of the circuit for coupling 126 is identified in FIGURE 3 by reference character 470. This passage communicates with a low speed coupling drain valve 472 which includes a relatively large diameter land 474 and a drain valve guide stem 476.

Land 474 is biased normally in a downward direction by valve spring 478. It is disposed within a valve chamber 480 with which passage 470 communicates. This passage 470 is blocked as indicated when the land 474 is urged in an upward direction. The drain valve assumes the position shown under the influence of pressure in the cavity 482 at the lower end of the chamber 480. The chamber 480 communicates with a pressure signal passage 484 which in turn communicates with a lubrication valve 486. This valve comprises a pair of pressure regulating valve lands 488 and 490 which have differential diameters. The valve is urged in an upward direction by valve spring 492 and, when it assumes the position shown, a regulated lube pressure is established in passage 484 by reason of the restricted communication with passage 494 which in turn communicates with the main line pressure passage 330. This reduced pressure acts upon the differential area of valve lands 488 and 490 and opposes the influence of spring 492. The reduced pressure normally is incapable of shifting the low speed coupling drain valve but it is sufficient to establish lubrication pressure for a front end lubrication valve circuit shown in part at 496.

When the selector valve is moved to the neutral position N, passage 400 is exhausted through an exhaust port 498. Passage 398 also is exhausted through the same port. Under these conditions the low drain valve will move to an open position thereby exhausting passage 470 through exhaust port 500.

When the selector valve is moved to the drive position "D," however, pressure immediately is made available to passage 400 and acts upon the upper end of the lube valve 486 to overcome the influence of spring 492. Pressure then is distributed directly from passage 400 through the lube valve chamber to passage 484. This causes the low speed coupling drain valve 472 to move to an upper position to block passage 470. The pressure signal thus made available to passage 400 is distributed also through passage 502 to the low limit valve 314. This urges the low limit valve in an upward direction against the opposing influence of low limit valve spring 504 to establish immediate communication between passage 332 and the low speed coupling feed passage 328.

Like the intermediate limit valve, the low limit valve is capable of acting as a regulator to establish a minimum line pressure during the time interval in which the low speed coupling is being filled. If the volumetric capacity of the pump 78 is insufficient to maintain pressure while it is filling the low speed coupling, the pressure in passage 502, of course, will decrease accordingly since it is supplied with a pressure corresponding to the main line pressure through the selector valve. If the pressure decreases to a value less than a desired minimum limit, the low limit valve will move in a downward direction, as viewed in FIGURE 3, to restrict the degree of communication between passage 332 and passage 328. This delays the filling of coupling 126 until the line pressure is restored.

The cavity of the low speed coupling is in communication with the atmosphere through a coupling vent valve that is similar in construction to the vent valve 272 as previously indicated. The low speed coupling vent valve is designated by reference character 270. As the coupling is being filled, air is evacuated through a relatively large diameter orifice 504 which communicates with exhaust passage 290. When the coupling is filled, however, the fluid will act upon the valve element 274 and urge it in a left-hand direction against the opposing influence of valve spring 276. This will block port 504. A limited degree of communication with the exhaust region is maintained, however, by a relatively small diameter restriction 506. This maintains a limited degree of continuous flow through the low speed coupling for cooling purposes.

The signal applied to the low speed coupling drain valve remains unchanged as the selector valve is moved to hill brake, drive or reverse. Thus the low speed coupling 126 remains filled under these drive conditions.

The intermediate drain valve, however, is controlled by the 1–2 shift valve and also by the 2–3 shift valve which now will be described.

The 2–3 shift valve is designated by reference character 508. It includes a multiple land valve spool 510 having spaced valve lands 512, 514, 516, 518, 520 and 522. Valve spool 510 is situated within a valve chamber 524 which defines internal valve lands that cooperate with the valve lands 512 through 522. An exhaust port for the valve chamber 524 is shown at 526.

Valve spool 510 normally is urged in a downward direction by the valve spring 528. It is urged in an upward direction by governor pressure distributed to a valve land 512 through passage 338. Reduced throttle pressure is distributed to the upper end of valve land 52 to oppose the influence of the governor pressure.

A reduced throttle pressure passage is shown at 530. It in turn communicates with a 2–3 TV reducer valve 532 which comprises a single diameter valve element 534 situated within a cooperating valve chamber 536. Throttle pressure in passage 358 is distributed to the lower end of element 534 through a passage 538. A reducer valve spring 540 oppose the influence of the throttle pressure. The resultant pressure thus made available to passage 530 acts upon the upper end of valve element 534. The magnitude of the pressure in passage 530 is determined by the calibration of spring 540 and is designed to establish the proper shift point for the 2–3 shift valve 508.

Passage 398 normally is blocked by land 514 when the valve element 510 assumes the position shown. Under these circumstances, passage 450 is exhausted through an exhaust port 542 which is situated adjacent passage 450 between valve lands 514 and 516. Thus the shuttle valve assumes the position shown in FIGURE 3 whenever the valve element 510 is in a downward position. This enables the 1–2 shift valve to control the operation of the intermediate coupling.

As previously explained, it is desired to render the intermediate coupling inactive when a shift from the direct drive high speed ratio is desired. This is accomplished by the 2–3 shift valve as it moves in an upward direction under the influence of governor pressure. When this occurs, communication is established between passage 398 and passage 450 through the annular space between valve lands 514 and 516. Passage 398 communicates with the valve chamber 524 through a branch passage 44, thus establishing the necessary communication with passage 450. As this occurs, the pressure thus made available to passage 450 shifts the shuttle valve element in an upward direction, thereby interrupting communication between the 1–2 signal pressure passage 418 and passage 444. Passage 444 then is exhausted through exhaust port 448, thereby permitting the intermediate drain valve to assume a downward poition under the influence of spring 458. This opens exhaust passage 460 thereby permitting the coupling to be emptied.

A direct drive clutch feed passage is shown at 546. It communicates with the valve chamber 524 at a location intermediate valve lands 512 and 514. A restricted exhaust port 548 also communicates with the valve chamber 524 at this location. Thus if the valve element 510 assumes the position shown, passage 546 is exhausted and this in turn causes the direct drive friction clutch servo to become exhausted. Passage 546, of course, communicates directly with the lock-up clutch servo through a passage 550. The clutch then is disengaged.

If the valve element 510 is upshifted as explained previously, land 512 blocks exhaust port 548 and establishes communication between passage 546 and the line pressure passage 398 which is pressurized when the selector valve is in the drive range position "D." Passage 546 and the lock-up clutch thus become pressurized and this establishes a direct connection between shaft 138 and the engine crankshaft as explained previously. When this occurs, of course, the intermediate coupling is evacuated in the manner previously described. The evacuation of the intermediate coupling and the application of the direct drive lock-up clutch must occur in a synchronous fashion since both cannot be active at the same time.

Upon a downshift from the direct drive ratio to the intermediate speed ratio, it is necessary to exhaust the lock-up clutch and fill the intermediate coupling. This is done as the 2–3 shift element assumes a downward position. When this occurs, the direct drive clutch is drained through the exhaust port 548. It is drained also through a parallel exhaust flow path defined in part by a clutch vent passage 552 which communicates with the valve chamber 524 at a location adjacent passage 546. Passage 552 extends to the kickdown control valve and is provided with an intermediate orifice 554. The kickdown control valve comprises the valve spool 556 having differential diameter valve lands 558 and 560. An exhaust port 562 communicates with the valve chamber 564 within which the valve spool 556 is situated. Upward movement of the valve spool 556 is opposed by valve spring 566. The kickdown control valve thus provides a controlled restriction in the clutch vent passage 552.

As the direct drive lock-up clutch is exhausted, a back pressure will be developed by reason of the restriction in port 548. This back pressure then urges the kickdown control valve spool 556 in an upward direction to open exhaust port 562 thereby providing a parallel exhaust flow path.

During a downshift from the direct drive ratio to the intermediate speed ratio at high speeds, it is desired to evacuate the servo for the lock-up clutch at a relatively rapid rate. This is because the filling time for the intermediate coupling will be reduced. This is accomplished by applying governor pressure to the differential area defined by valve lands 558 and 560. Governor pressure is distributed to this area through a governor pressure passage 568 and branch passage 570. This increases the degree of communication between clutch vent passage 552 and the exhaust port 562. On the other hand, at low vehicle speeds it is desired to reduce the rate of release of the lock-up clutch since the rate of fill of the coupling will be reduced. The kickdown control valve accomplishes this since the correspondingly reduced governor pressure will cause an increase in the degree of communication between passage 552 and the exhaust port 562.

The requirement for synchronism in the operation of the intermediate coupling in the lock-up clutch during a shift between the direct drive ratio and the intermediate speed ratio makes desirable the use of an accumulator. The accumulator is shown generally by reference character 572. It comprises an accumulator piston 574 situated within an accumulator cylinder 576. Line pressure is distributed to the cylinder 576 on the lower side of the piston 574 through a line pressure branch passage 578 that communicates with passage 392. Clutch pressure is applied to the other side of the piston 574 through the passage 550. Thus the accumulator will stroke during application of the lock-up clutch thereby delaying and cushioning the application of the clutch. The same accumulator, of course, will cause a timed delay in the release of the clutch during a forced downshift, and the degree of the delay is in turn controlled by the kickdown control valve as explained previously.

Because of the accumulating action associated with the lock-up clutch, it becomes necessary under certain circumstances to by-pass the accumulator. For example, if the vehicle is brought to a very quick stop, it is necessary to disengage the lock-up clutch to prevent the vehicle engine from becoming stalled due to a delay in the release of the lock-up clutch. For this reason, I have provided an accumulator dump valve situated in parallel relationship with respect to the passage of 550. This dump valve is shown at 580. It comprises a valve spool 582 having a pair of lands 584 and 586. Valve element 582 is situated in a dump valve chamber 588. Passage 550 communicates with the chamber 558 at a point intermediate the lands 584 and 586. The lower end of the dump valve chamber 588 is subjected to governor pressure by means of governor pressure passage 568. During normal operation, the governor pressure is sufficient to maintain the valve element 582 in the position shown. Under the conditions described, however, valve spring 590 will be sufficient to overcome the influence of the governor pressure thereby causing the dump valve to move in a downward direction. This exhausts passage 550 through an exhaust port 592. This occurs at a very low speed, but it insures that the lock-up clutch will become disengaged during a quick stop of the vehicle without pulling down the engine to a stall.

Throttle pressure is obtained by means of throttle valve 594. The throttle valve includes a valve spool 596 having three spaced valve lands 598, 600 and 602 disposed within a valve chamber 604. Line pressure is distributed to the chamber 604 at a point intermediate valve lands 598 and 600 through a branch line passage 606 which communicates directly with main pressure passage 330. An exhaust port 608 communicates with the left end of the valve chamber.

A valve plunger 610 is slidably situated within the extreme left end of the valve chamber. A throttle valve spring 612 is disposed between valve element 596 and plunger 610. Another plunger 614 positioned telescopically within plunger 610 includes a stem 616 extending through an opening in the end of plunger 610. A relatively high rate spring 618 is disposed between the plungers 614 and 610, and a stop 620 limits the relative axial movement of one with respect to the other.

An accelerator pedal for the vehicle engine throttle valve is shown at 622. It is mechanically connected to the plunger 614 through a mechanical linkage schematically indicated at 624.

As the vehicle operator depresses the accelerator pedal 622, the plungers 610 and 614 move as a unit in a right hand direction thereby tending to compress spring 612. The resultant spring force is transmitted to the valve element 596 and a controlled degree of communication then is established between passage 606 and a throttle pressure passage 626. Valve lands 600 and 602 are formed with a differential diameter and the throttle pressure in passage 626 acts upon the associated area to oppose the influence of spring 612. It thus is apparent that the throttle valve will function to establish a modulated pressure in passage 626 which is an indicator of the position of the accelerator pedal 622. This can be considered to be a torque demand signal. If desired, an engine intake manifold pressure operated servo can be employed for actuating the throttle valve mechanism in lieu of the accelerator pedal 622. The signal that then would be made available to passage 626 would be an indicator of the engine intake manifold pressure.

After a predetermined accelerator travel is accomplished, a plunger 610 strikes a shoulder 628 formed in the valve body within which chamber 604 is situated. This occurs when the engine throttle valve is moved to approximately three-quarters of its wide open position. Upon continued movement of the accelerator pedal, plunger 614 will move against the spring 618 relative to plunger 610. Stem 616 then engages a pin 628 slidably received through an opening formed in the center of valve element 596. The force applied to the plunger 614 then is distributed directly to a kickdown valve plunger 630 located in a relatively large diameter chamber 632.

Valve plunger 630 is formed with spaced valve lands 634 and 636. A kickdown pressure passage 638 communicates with the chamber 632 at a point intermediate the lands 634 and 636. An exhaust port 640 also communicates with the chamber 632 at the same location. When the plunger 630 is in the position shown, kickdown pressure passage 638 is exhausted through the port 640. Throttle pressure in passage 626 acts upon the right hand end of the plunger 630 to supplement the biasing action of a valve spring 642 and provides a detent feel which is experienced by the operator after he passes the three-quarter engine throttle position. Upon continued movement of the accelerator pedal beyond that position, however, plunger 630 is moved in a right hand direction to close port 640 and open passage 638 to throttle pressure. Communication is established then between passage 626 and passage 638 through the right hand end of the valve chamber 632. This so-called kickdown pressure is distributed through passage 638 to each of the shift valves and overrules the forces acting on the shift valves in an upward direction.

If the vehicle is traveling at a relatively high speed, the 1–2 shift valve will not become down-shifted under the influence of kickdown pressure immediately. Instead the 2–3 valve will become down-shifted, and as the vehicle is decelerated the 1–2 shift valve follows the action of the 2–3 shift valve.

With this throttle valve arrangement, it is possible to establish a throttle pressure in passage 358 that will maintain the proper shift points. The throttle valve mechanism includes an inherent throttle pressure limiting feature by reason of the action of the plunger 610 and its associated stop.

Travel of the vehicle engine throttle beyond the three-quarter position is not accompanied normally by an increase in engine torque. For this reason, it is inappropriate to cause a corresponding increase in pressure passage 626 as the throttle is advanced beyond the three-quarter setting. But it is unnecessary to provide a separate throttle pressure limiting valve in the circuit to provide an upper limit for the throttle pressure since this is accomplished by my improved throttle valve itself.

Having thus described a preferred embodiment of my invention, what I claim and desire to secure by United States Letters Patent is:

1. In a multiple speed power transmission mechanism having a gear unit with a power input element and a power output element, a driving member, a hydrokinetic torque transmitting unit comprising an impeller and a turbine disposed in a torus circuit in fluid flow relationship, said impeller being connected to said driving member and said turbine being connected to said input element, a fluid pressure source, a fluid feed passage extending from said source to said torus circuit, an exhaust passage communicating with said torus circuit, a drain valve means in said exhaust passage for selectively opening and blocking the exhaust flow of fluid from said torus circuit, a valve system pressurized by said source for controlling the operation of said drain valve means including a first signal passage means communicating with said drain valve means for selectively subjecting the latter to fluid pressure, a limit valve means disposed in and partly defining said feed passage for controlling the rate of fluid flow from said source to said torus circuit, and a second signal passage means communicating with said limit valve means for subjecting the latter to system pressure to actuate the same and open said feed passage.

2. In a multiple speed ratio power transmission mechanism for delivering power from an engine to a driven member comprising a gear unit with a power input element and a power output element connected to said driven member, a hydrokinetic torque transmitting unit connecting said engine to said input element and comprising an impeller and a turbine disposed in a torus circuit in fluid flow relationship, a fluid pressure pump, regulator valve means for controlling the effective discharge pressure of said pump, a fluid feed passage extending from said pump to said torus circuit, an exhaust passage communicating with said circuit, a drain valve means in said exhaust passage for selectively opening and blocking the exhaust flow of fluid from said torus circuit, a valve system pressurized by said pump including a torque demand sensitive portion and a driven speed sensitive portion for controlling the operation of said drain valve means, a first signal pressure passage communicating with said drain valve means for delivering actuating pressure thereto, a limit valve means disposed in and partly defining said feed passage for controlling the rate of flow of fluid from said source to said torus circuit, a second fluid pressure signal passage communicating with said limit valve means for subjecting the latter to system pressure, each signal passage means being subjected to the effective pressure of said pump, said limit valve means being adapted to open said feed passage in response to pressure distribution by said valve system to said signal pressure passage, a source of an engine torque demand presure signal, a source of a pressure signal that is proportional in magnitude to the speed of said driven member, and means for subjecting said torque demand sensitive portion and said speed sensitive portion to said signals respectively to initiate a controlled response of said limit valve means and said drain valve means.

3. In a multiple speed power transmission mechanism for delivering power from a driving member to a driven member comprising a gear unit with a power input element and a power output element, said power output element being connected to said driven member, a hydrokinetic torque transmitting unit connecting said driving member to said power input element, a friction clutch means for establishing a driving connection between said driving and driven members, said hydrokinetic unit comprising an impeller and a turbine disposed in a torus circuit in fluid flow relationship, a fluid pressure pump, a fluid feed passage extending from said pump to said torus circuit, an exhaust passage communicating with said torus circuit, a drain valve means in said exhaust passage for selectively opening and blocking the exhaust flow of fluid form said torus circuit, a valve system pressurized by said pump for controlling the operation of said drain valve means including a first pressure signal passage communicating with said drain valve means for applying an actuating pressure thereto, a limit valve means disposed in and partly defining said feed passage for controlling the rate of flow of fluid from said pump to said circuit, a second pressure signal passage communicating with said limit valve means for subjecting the latter to system pressure, a source of torque demand sensitive pressure, and a clutch feed passage extending from said valve system to said clutch means, said valve system being subjected to said torque demand and speed sensitive pressure to initiate selective distribution of pressure to said signal passages and to said clutch feed passage whereby speed ratio changes between a direct drive ratio and an under drive ratio in said transmission can be accomplished.

4. In a multiple speed power transmission mechanism for delivering power from a driving member to a driven member comprising a gear unit with a power input element and a power output element, said power output element being connected to said driven member, a hydrokinetic torque transmitting unit connecting said driving member to said power input element, a friction clutch means for establishing a driving connection between said driving and driven members, said hydrokinetic unit comprising an impeller and a turbine disposed in a torus circuit in fluid flow relationship, a fluid pressure pump, a fluid feed passage extending from said pump to said torus circuit, an exhaust passage communicating with said torus circuit, a drain valve means in said exhaust passage for selectively opening and blocking the exhaust flow of fluid from said torus circuit, a valve system pressurized by said pump for controlling the operation of said drain valve means including a first pressure signal passage communicating with said drain valve means for applying an actuating pressure thereto, a limit valve means disposed in and partly defining said feed passage for controlling the rate of flow of fluid from said pump to said circuit, a second pressure signal passage communicating with said limit valve means for subjecting the latter to system pressure, a source of torque demand sensitive pressure, a clutch feed passage extending from said valve system to said clutch means, said valve system being subjected to said torque demand and speed sensitive pressures to initiate selective distribution of pressure to said signal passages and to said clutch feed passage whereby speed ratio changes between a direct drive ratio and an under drive ratio in said transmission can be accomplished, a regulator valve means for regulating the effective output pressure of said pump, and an auxiliary boost passage extending from said torque demand sensitive pressure source to said regulator valve means whereby the system pressure is increased upon an increase in torque demand.

5. In a multiple speed power transmission mechanism for delivering power from a driving member to a driven member comprising a gear unit with a power input element and a power output element, said power output element being connected to said driven member, a first hydrokinetic torque transmitting unit connecting said driving member to said power input element, a friction clutch means for establishing a driving connection between said driving and driven members, said hydrokinetic unit comprising an impeller and a turbine disposed in a torus circuit in fluid flow relationship, a fluid pressure pump, a fluid feed passage extending from said pump to said torus circuit, an exhaust passage communicating with said torus circuit, a drain valve means in said exhaust passage for selectively opening and blocking the exhaust flow of fluid from said torus circuit, a valve system pressurized by said pump for controlling the operation of said drain valve means including a first pressure signal passage communicating with said drain valve means for applying an actuating pressure thereto, a limit valve means disposed in and partly defining said feed passage for controlling the rate of flow of fluid from said pump to said circuit, a second pressure signal passage communicating with said limit valve means for subjecting the latter to system pressure, a source of torque demand sensitive pressure, a clutch feed passage extending from said valve system to said clutch means, said valve system being subjected to said torque demand and speed sensitive pressures to initiate selective distribution of pressure to said signal passages and to said clutch feed passage, said gear unit including also a second power input element, a second hydrokinetic torque transmitting unit for establishing a driving connection between said driving member and said second power input element, a second feed passage extending from said pump to said second unit, a second limit valve means disposed in and partly defining said second feed passage for selectively opening and closing said second feed passage, a second exhaust passage communicating with said second unit, said second exhaust passage being defined in part by a second drain valve means for opening and closing the same, and manually operated valve means for selectively distributing a signal pressure from said system to said second drain valve means and said second limit valve means whereby the latter is opened and the former is closed upon application of system pressure thereto.

6. In a multiple speed power transmission mechanism for delivering power from a driving member to a driven member comprising a gear unit with a power input element and a power output element, said power output element being connected to said driven member, a first hydrokinetic torque transmitting unit connecting said driving member to said power input element, a friction clutch means for establishing a driving connection between said driving and driven members, said hydrokinetic unit comprising an impeller and a turbine disposed in a torus circuit in fluid flow relationship, a fluid pressure pump, a fluid feed passage extending from said pump to said torus circuit, an exhaust passage communicating with said torus circuit, a drain valve means in said exhaust passage for selectively opening and blocking the exhaust flow of fluid from said torus circuit, a valve system pressurized by said pump for controlling the operation of said drain valve means including a first pressure signal passage communicating with said drain valve means for applying an actuating pressure thereto, a limit valve means disposed in and partly defining said feed passage for controlling the rate of flow of fluid from said source to said circuit, a second pressure signal passage communicating with said limit valve means for subjecting the latter to system pressure, a source of torque demand sensitive pressure, a clutch feed passage extending from said valve system to said clutch means, said valve system being subjected to said torque demand and speed sensitive pressure to initiate selective distribution of pressure to said signal passages and to said clutch means whereby speed ratio changes between a first drive ratio and a second drive ratio in said transmission can be accomplished, said gear unit including also a second power input element, a second hydrokinetic torque transmitting unit for establishing a driving connection between said driving member and said second power input element, a second feed passage extending from said pump to said second unit, a second limit valve means disposed in and partly defining said second feed passage for selectively opening and closing said second feed passage, a second exhaust passage communicating with said second unit, said second exhaust passage being defined in part by a second drain valve means for opening and closing the same, manually operated valve means for selectively distributing a signal pressure from said system to said second drain valve means and said second limit valve means whereby the latter is opened and the former is closed upon application of system pressure thereto, a regulator valve means for regulating the effective output pressure of said pump, and auxiliary passage means for subjecting said regulator valve means to said torque demand sensitive pressure whereby the effective system pressure is increased upon an increase in engine torque demand.

7. In a power transmission mechanism for delivering power from an engine to a driven member, a gear unit having a pair of power input elements, a power output element of said gear unit being connected to said driven member, two hydrokinetic torque transmitting units, one unit being adapted to establish a driving connection between said driving member and one input element and the other hydrokinetic unit being adapted to establish another driving connection between said driving member and the other power input element, a fluid pressure operated friction clutch means for establishing a direct drive connection between said driving and driven members, a fluid pressure pump drivably connected to a power delivery element of said mechanism, two semi-isolated pressure systems each of which is in fluid communication with the pump, one pressure system comprising separate feed passages extending to each coupling, a separate limit valve means disposed in and partly defining each feed passage for selectively opening and closing the same, a separate exhaust flow path communicating with each hydrokinetic unit, a separate drain valve means disposed in and partly defining each exhaust flow path for opening and closing the same, said second system including a first shift valve means for selectively distributing pressure to the drain valve means and the limit valve means for said second hydrokinetic unit to effect selective emptying and filling thereof, and a second shift valve means for selectively overruling the action of said first shift valve means and distributing pressure to said clutch means.

8. In a power transmission mechanism for delivering power from an engine to a driven member, a gear unit having a pair of power input elements, a power output element of said gear unit being connected to said driven member, two hydrokinetic torque transmitting units, one unit being adapted to establish a driving connection between said driving member and one input element and the other hydrokinetic unit being adapted to establish a second driving connection between said driving member and the other power input element, a fluid pressure operated friction clutch means for establishing a direct drive connection between said driving and driven members, a fluid pressure pump drivably connected to a power delivery element of said mechanism, two semi-isolated pressure systems each of which is in fluid communication with the pump, one pressure system comprising separate feed passages extending to each coupling, a separate limit valve means disposed in and partly defining each feed passage for selectively opening and closing the same, a separate exhaust flow path communicating with each hydrokinetic unit, a separate drain valve means disposed in and partly defining each exhaust flow path passage for opening and closing the same, said second system including a first shift valve means for selectively distributing pressure to the drain valve means and the limit valve means for said second hydrokinetic unit to effect selective emptying and filling thereof, a second shift valve means for selectively overruling the action of said first shift valve means and distributing pressure to said clutch means, a fluid connection between said first shift valve means and the feed passages for the drain valve and the limit valve for said first hydrokinetic unit, said fluid connection being defined in part by a shuttle valve means for selectively completing said fluid connection and exhausing the associated drain valve and limit valve, and a shuttle valve feed passage communicating with said second shift valve means, said shuttle valve feed passage being pressurized in response to a controlling movement of said second shift valve means.

9. In a power transmission mechanism comprising a drive member, a driven member, a gear unit having an input element, an output element of said gear unit being connected to said driven member, a hydrokinetic unit adapted to establish a driving connection between said driving member and said power input element, a fluid pressure operated friction clutch means for establishing a direct drive connection between said driving member and said driven member, a fluid pressure pump drivably connected to a power delivery portion of said mechanism, a fluid pressure valve system establishing a first fluid connection between said pump and said friction clutch means and a second connection between said pump and said hydrokinetic unit, fluid pressure distributor valve means forming a part of said system for exhausting said hydrokinetic unit and pressurizing said friction clutch means to establish a direct drive ratio in said mechanism and for filling said hydrokinetic unit and exhausting said friction clutch means to establish an under drive ratio in said mechanism, said valve system including a feed passage extending to said friction clutch means, and a downshift control valve means comprising an exhaust port and an exhaust passage communicating with said clutch feed passage, said downshift control valve means including driven speed sensitive portions adapted to restrict said exhaust passage, the degree of restriction being proportional to the speed of said driven member.

10. In a power transmission mechanism comprising a drive member, a driven member, a gear unit having an input element, an output element of said gear unit being connected to said driven member, a hydrokinetic unit adapted to establish a driving connection between said driving member and said power input element, a fluid pressure operated friction clutch means for establishing a direct drive connection between said driving member and said driven member, a fluid pressure pump drivably connected to a power delivery portion of said mechanism, a fluid pressure valve system establishing a first fluid connection between said pump and said friction clutch means and a second connection between said pump and said hydrokinetic unit, fluid pressure distributor valve means forming a part of said system for exhausting said hydrokinetic unit and pressurizing said friction clutch means to establish a direct drive ratio in said mechanism and for filling said hydrokinetic unit and exhausting said friction clutch means to establish an under drive ratio in said mechanism, said valve system including a feed passage extending to said friction clutch means, a downshift control valve means comprising an exhaust port and an exhaust passage communicating with said clutch feed passage, said downshift control valve means including driven speed sensitive portions adapted to restrict said exhaust passage, the degree of restriction being proportional to the speed of said driven member, an accumulator comprising a cylinder and a movable piston disposed in said cylinder and defining therewith a pair of pressure chambers, one chamber communicating with said clutch means and the other chamber communicating with said valve system.

11. In a power transmission mechanism comprising a drive member, a driven member, a gear unit having an input element, an output element of said gear unit being connected to said driven member, a hydrokinetic unit adapted to establish a driving connection between said driving member and said power input element, a fluid pressure operated friction clutch means for establishing a direct drive connection between said driving member and said driven member, a fluid pressure pump drivably connected to a power delivery portion of said mechanism, a fluid pressure valve system establishing a first fluid connection between said pump and said friction clutch means and a second connection between said pump and said hydrokinetic unit, fluid pressure distributor valve means forming a part of said system for exhausting said hydrokinetic unit and pressurizing said friction clutch means for establishing a direct drive ratio in said mechanism and filling said hydrokinetic unit and exhausting said friction clutch means to establish an under drive ratio in said mechanism, said valve system including a feed passage extending to said friction clutch means for exhausting pressure therefrom, a downshift control valve means comprising an exhaust port and an exhaust passage communicating with said clutch feed passage, a source of driven speed sensitive pressure, said downshift control valve means including driven speed sensitive portions adapted to restrict said exhaust passage, the degree of restriction being proportional to the speed of said driven member, an accumulator comprising a cylinder, a movable piston in said cylinder and defining therewith a pair of pressure chambers, one chamber communicating with said clutch means and the other chamber communicating with said system, and a dump valve means communicating with said first accumulator pressure chamber in parallel relationship with respect to said clutch feed passage for exhausting said feed passage and bypassing said accumulator at reduced operating speeds, said dump valve means having a portion in fluid communication with said speed sensitive pressure whereby it is urged toward a feed passage blocking position.

References Cited by the Examiner
UNITED STATES PATENTS
2,818,708   1/58   Kelley.

DON A. WAITE, *Primary Examiner.*